No. 746,005. PATENTED DEC. 8, 1903.
C. W. BRIERTON.
FEEDER FOR CORN HUSKERS.
APPLICATION FILED MAR. 1, 1902.
NO MODEL.

Witnesses
Jas. H. Blackwood
O. T. Randolph, Jr.

Inventor
Charles W. Brierton
by D. A. Gouick
Attorney

THE NORRIS PETERS CO., PHOTO-LITHO., WASHINGTON, D. C.

No. 746,005. Patented December 8, 1903.

UNITED STATES PATENT OFFICE.

CHARLES W. BRIERTON, OF DIXON, ILLINOIS.

FEEDER FOR CORN-HUSKERS.

SPECIFICATION forming part of Letters Patent No. 746,005, dated December 8, 1903.

Application filed March 1, 1902. Serial No. 96,316. (No model.)

*To all whom it may concern:*

Be it known that I, CHARLES W. BRIERTON, a citizen of the United States, residing at Dixon, in the county of Lee and State of Illinois, have invented certain new and useful Improvements in Feeders for Corn-Huskers, of which the following is a specification.

My invention relates to devices for feeding the stalks of corn to the snapping-rolls, and has for its object to provide bars that bridge the space between the endless apron of a feeding attachment and the snapping-rolls to prevent pieces of stalk that might become crossed in the feeder dropping through to the husking-rolls and interfering with their operation and that will not prevent the ears snapped off from dropping to the husking-rolls.

Figure 1:
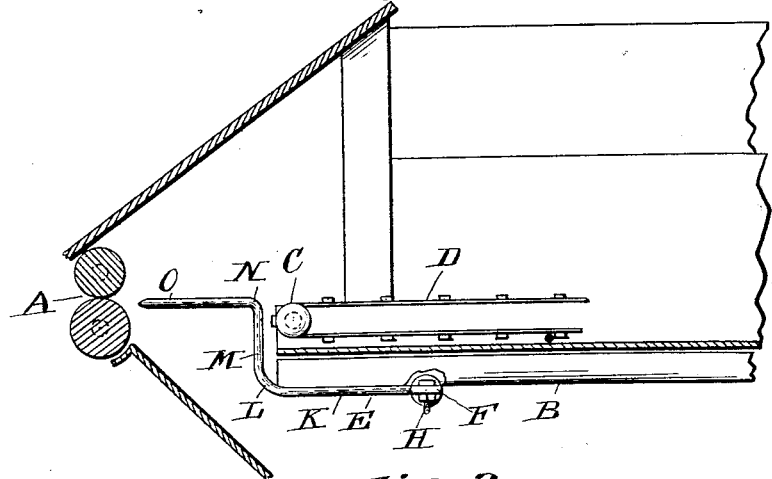
Figure 2:
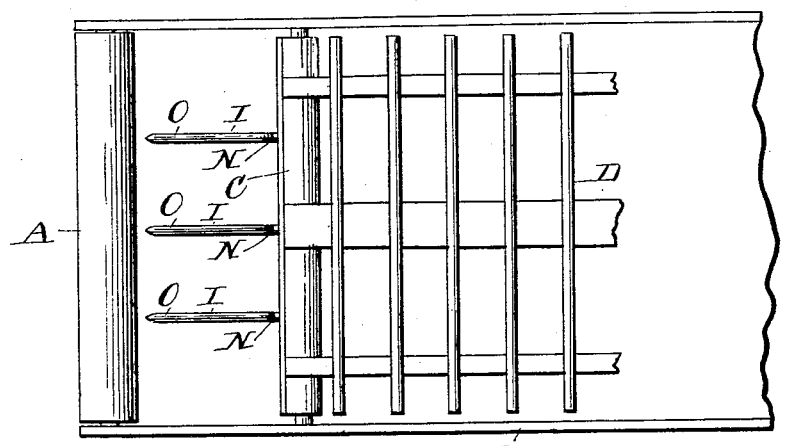
Figure 3:
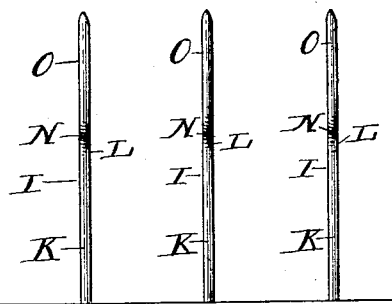

In the drawings, Figure 1 is a side view, partly in section, of a portion of a feeding attachment and snapping-rolls, showing the application of my invention. Fig. 2 is a top plan view thereof, and Fig. 3 a detail view of my attachment.

Referring to the drawings, in which similar reference characters indicate corresponding parts throughout the several views, A represents the snapping-rolls of a corn-husker; B, the frame of the feeding attachment, which is generally manufactured separate from the husking-machine; C, one of the drums, journaled in the frame B, and D an endless apron actuated and carried by said drum C.

E represents my attachment, which consists of a bar F of any suitable shape, having holes G at each end to fasten it transversely of the bottom of the frame B by means of bolts H.

I represents a plurality of fingers secured in the bar F, the number shown in the drawings being three, though it will be readily understood that they may be increased or diminished in number without departing from the spirit of my invention.

Each finger I extends forward on a line substantially parallel to the base of the frame B, as shown at K, and is then curved upwardly, as shown at L, so as to avoid the drum C, and extended vertically upward, as shown at M, to the level of the top of the apron D, where it is bent at right angles, as shown at N, and the end O extends to the snapping-rolls A.

It will be readily seen that the parts O of the fingers I will catch any stalks that may become twisted in feeding and carry them along to the husking-rolls with the stalks that are being pushed straight toward the husking-rolls. It will also be apparent that the bar F and fingers I may be applied to any form of feeding mechanism, whether an endless apron, as shown, reciprocating toothed bars, or any other selected form.

Having thus described my invention, what I claim is—

A feeder for corn-huskers comprising, in combination with a feeder-frame, drums journaled therein, a single, continuous, endless apron mounted on said drums, a rigid bar having holes at its ends to receive bolts on the bottom of the frame to secure it thereto, and parallel fingers each separately and rigidly secured to said bar, all of said fingers extending from said bar on a horizontal plane, then curved upward along the front of said apron, and finally bent sharply to a horizontal position and extended on the same plane as the apron aforesaid, substantially as shown and described.

In testimony whereof I hereto affix my signature in the presence of two witnesses.

CHARLES W. BRIERTON.

Witnesses:
C. W. BREWSTER,
A. F. MILLOT.